United States Patent [19]
Hornak et al.

[11] 4,198,879
[45] Apr. 22, 1980

[54] METHOD FOR THE MANUFACTURE OF CONNECTING RODS FOR SMALL RECIPROCATING ENGINES

[75] Inventors: Michael A. Hornak, Walnut; Fred E. Edward, San Gabriel, both of Calif.

[73] Assignee: Calnetics Corporation, Cerritos, Calif.

[21] Appl. No.: 851,096

[22] Filed: Nov. 14, 1977

[51] Int. Cl.$^2$ ............................................. G05G 1/00
[52] U.S. Cl. .............................. 74/579 E; 29/156.5 A
[58] Field of Search ................. 74/579 E; 29/156.5 A

[56] References Cited
U.S. PATENT DOCUMENTS

| | | | |
|---|---|---|---|
| 2,145,864 | 2/1939 | Denneen et al. | 29/156.5 A |
| 2,553,935 | 5/1951 | Parks et al. | 74/579 E |
| 3,818,577 | 6/1974 | Bailey et al. | 29/156.5 A X |
| 3,994,054 | 11/1976 | Cuddon-Fletcher et al. | 29/156.5 A |
| 4,030,179 | 6/1977 | Schwarz | 74/579 E X |

*Primary Examiner*—Samuel Scott
*Assistant Examiner*—Wesley S. Ratliff, Jr.
*Attorney, Agent, or Firm*—Knobbe, Martens, Olson, Hubbard & Bear

[57] ABSTRACT

A method for economically manufacturing connecting rods for small reciprocating engines having a mating shank and cap. This method includes the steps of fine blanking the shank and cap portions of the rod, and simultaneously broaching these portions to obtain mating serrations on the crank pin bore and the shank-cap interface.

7 Claims, 4 Drawing Figures

U.S. Patent     Apr. 22, 1980     4,198,879
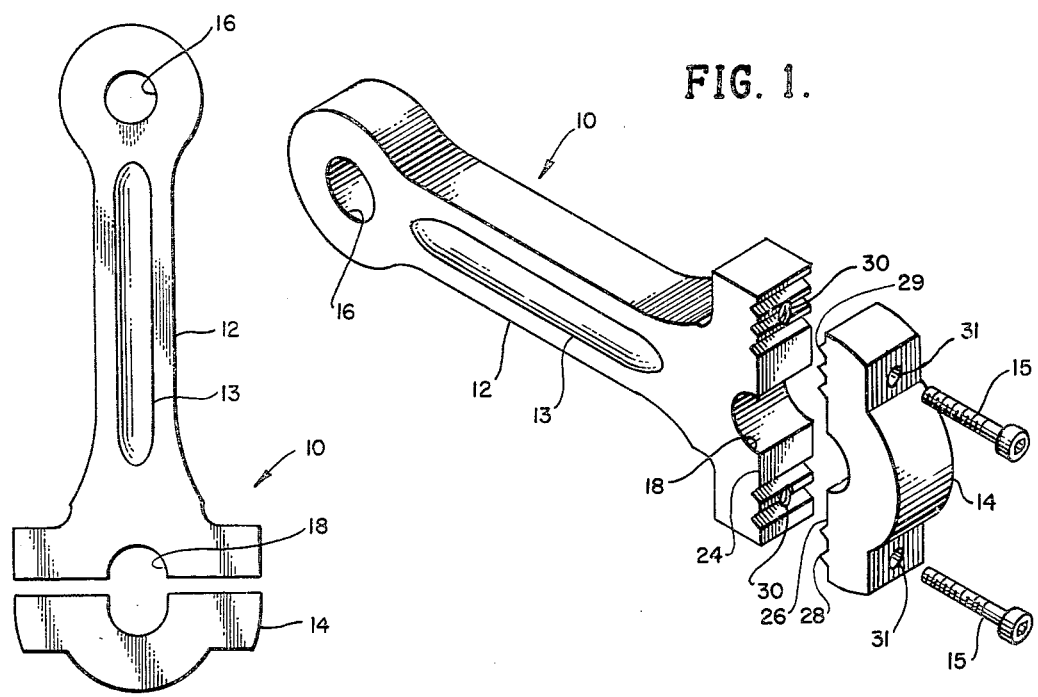
FIG. 1.
FIG. 2.
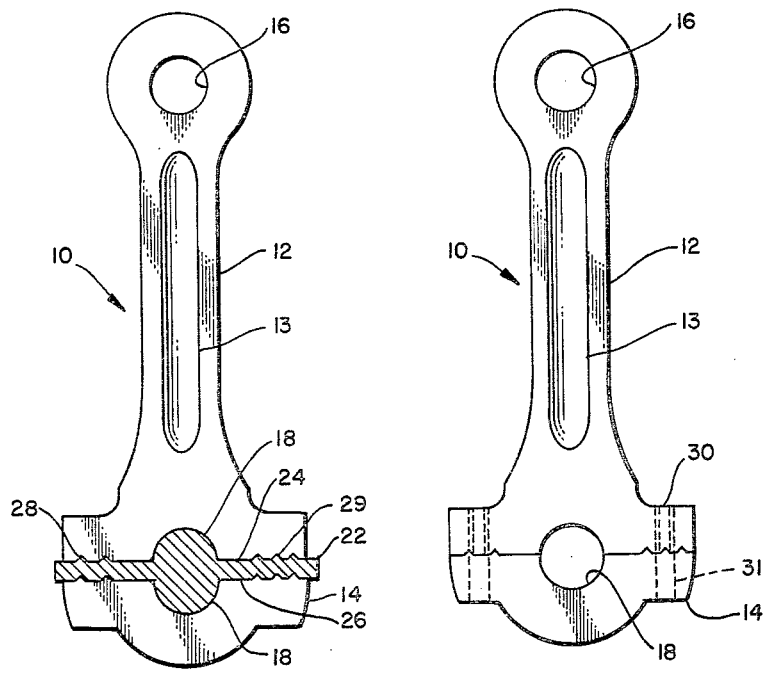
FIG. 3.     FIG. 4.

METHOD FOR THE MANUFACTURE OF CONNECTING RODS FOR SMALL RECIPROCATING ENGINES

BACKGROUND OF THE INVENTION

The present invention relates to a novel and efficient method for the manufacture of connecting rods. The invention is particularly advantageous for the manufacture of connecting rods for use in small internal combustion reciprocating engines. Such engines have low horsepower output and are utilized in machines which perform a wide variety of useful functions. For example, engines which would typically employ connecting rods manufactured according to the method of the present invention include weed trimmers, lawn edgers, handheld chain saws, and go-carts.

Historically, manufacturers of connecting rods for these small, low horsepower engines have utilized the same general method of manufacturing used by manufacturers of larger rods. Typically, the first step in such prior art method has been to forge the two parts which together make up a connecting rod, that is, the shank and the cap. This two part construction is necessary for the assembly of the connecting rod to the crank shaft pin. The next step involves grinding flat the upper and lower horizontal surfaces of the forging. Additional machining steps include the machining of the inner and outer configurations of the rod, the respective surfaces of the shank and the cap which are joined together, and any serrations in such surfaces or similar means for insuring non-slippage at the shank-cap juncture. Bolt holes for securing the cap to the shank are then drilled and tapped, followed by the machining of the crank pin and wrist pin bores. Following heat treatment of the rod, the inner diameters of the bores are ground to the proper tolerances.

The above-described method is far from satisfactory with respect to the manufacture of connecting rods for small engines. First, the process involves far too many steps so that the connecting rods cannot be economically produced fast enough to meet the great demand for them. Secondly, the reduced size of the connecting rods makes it very difficult to maintain dimensional accuracy throughout the several grinding and machining steps. Thus, the costly and slow-paced construction of connecting rods for small reciprocating engines has become a serious problem in an extremely competitive and cost-conscious industry.

In an attempt to solve the cost and production inefficiencies of the above-described prior art method of manufacture, several manufacturers of small connecting rods have modified the method slightly. Instead of forging the shank and cap separately, the modified method involves the forging of a single connecting rod configuration. The usual steps of grinding the outer surfaces, machining the inner and outer configurations, and drilling and tapping bolt holes follow. Then shallow slots are cut in the rod where the shank and cap portions normally meet, and following the heat treatment, the rod is broken at the slots to produce separate shank and cap portions.

The obvious advantage of this modified method is the elimination of the necessity of machining the mating surfaces of the shank and cap. Nevertheless, there are still many disadvantages associated with this method which precludes it from being a solution to the inefficiencies of prior methods. For example, it has been found that the rate of production of connecting rods utilizing this method is still too slow and uneconomical to meet the demand for such rods. Usually the rods are broken manually which is not only a costly operation, but time consuming as well.

Probably the most disadvantageous aspect of this breaking process is the extremely high scrap rate experienced, typically on the order of 30-40%. The caps broken off from the shank are often lost and the entire part has to therefore be discarded. Furthermore, if the part is hit too hard or inaccurately, it does not break correctly at the slot and again the part becomes scrap. Even if the part breaks at the slot, there is no assurance that the two pieces will mate when joined, as chips oftentimes are broken off and their absence prevents the mating of the shank to the cap.

There are further disadvantages in the heat treatment phase of this modified method. Contributing to the extremely high scrap rate is the warpage of the rods experienced during heat treatment. Warpage, or distortion as it is frequently referred to, during the heat treatment of metals is a function of the amount of growth of the crystalline units or "grains" which structurally constitute the metal being treated. The greater the growth of the grains during heat treatment, the greater the likelihood of warpage of the part. The two factors which contribute to large grain growth are the high temperature to which the metal is subjected, and the period of time of the heat treatment itself.

It is common for a low-carbon steel to be used in the production of small connecting rods. Therefore, it is advantageous to add carbon during the heat treatment process so as to provide for strength in the part. This carbon additive process is called "case hardening." Case hardening, however, lengthens the period of the heat treatment since time is required for the carbon atoms to diffuse into the grain structure of the metal. Furthermore, a hot worked metal, such as a forging, must be heat treated at a higher temperature than similar cold worked metals. These factors, taken together, explain the warpage suffered by the connecting rods manufactured under the breaking method. Such warpage also contributes, of course, to the high scrap rate of that method. Even if the part is not scrapped, a warped part must be machined before it can be functional. Thus, the manufacturer incurs added time and expense.

In order to avoid the problems of the breaking method, a few manufacturers have begun to produce single piece connecting rods. Although simplifying connecting rod manufacture, these single piece connecting rods create substantial problems with respect to the manufacture of complimentary crank shafts. Obviously, a single piece connecting rod requires either a two piece crank shaft, (and thus substantially increases the cost of manufacture and assembly of the crank shaft) or a single piece crank shaft with counter weight missing (a crank shaft generally suited to only the smallest of the small reciprocating engine class.)

SUMMARY OF THE INVENTION

The present invention provides for the rapid and economic manufacture of connecting rods which are as strong and durable as previously forged connecting rods. Because of the utilization of fine blanking and broaching operations, the present invention offers a method of manufacture which produces strong and accurately dimensioned connecting rods at a very fast rate and a fraction of the cost of previous methods.

The method begins with the operation of fine blanking distinct shank and cap pieces. Blanking is an accurate process which eliminates several machining steps, with only a minor deburring operation necessary to complete the outer configuration of the connecting rod. This step also alleviates the warpage problem associated with forgings and related heat treatment processes. A broaching operation is then employed to drill the crank pin bore to very accurate dimensions, while simultaneously cutting horizontal serrations in the mating surface for a more accurate and secure mate between shank and cap portions. Bolt holes are then drilled and tapped, followed by the heat treatment of the connecting rod. Finally, the inner diameters of the bores are finely honed to proper tolerances.

There are many aspects of the present method which make it highly advantageous over previous connecting rod methods of manufacture. The fine blanking operation eliminates the need for three separate machining operations: (i) grinding of the outer surfaces of the forged rod to flatten them; (ii) machining the inner, and (iii) machining the outer configurations of the finished rod. The broaching operation eliminates the need for four separate machining operations: (i) the separate machining of the mating surface of the shank; (ii) the separate machining of the mating surface of the cap, and (iii) the separate cutting of serrations in the mating surface of the shank, and (iv) the separate cutting of serrations in the mating surface of the cap. Thus, the broach is able to accurately drill the crank pin bore while simultaneously cutting the matable serrations in the crank and cap mating surfaces.

While not a requirement of the invention, the accuracy of this broaching process may also be sufficiently high so as to permit the interchangeability of caps and shanks, something not possible with the prior art techniques.

A particular advantage of the method of this invention is elimination of the necessity of breaking the connecting rod and all of the disadvantages associated therewith. The elimination of most of the grinding and machining operations required by the breaking method, allows for a substantially faster and more efficient production of small connecting rods. Moreover, the extremely high scrap rate under that prior method of manufacture due to the non-mating of shank and cap portions is greatly reduced under the method of the present invention.

Furthermore, scrappage due to the warping problem of the breaking method is also greatly reduced under the present invention. Fine blanking is a cold working operation, and the blanks themselves are stamped out of cold rolled steel. Cold working of metal produces a very fine grain structure. The primary advantage of fine or small grain size is the strength which a metal having such grain structure exhibits. Secondary advantages of such grain structure are that a part so constituted is less likely to warp during heat treatment due to the lower temperature requirements of such treatment, and the reduced time of heat treatment. Also, in accordance with the preferred form of the present invention, steel of a higher carbon content than usual is used to produce the blanks. This means that only minor case hardening is necessary, with the substantially reduced length of heat treatment resulting in less warpage of the part.

These and other advantages of the present invention can best be understood by reference to the drawings, in which:

FIG. 1 is a perspective view of a small connecting rod showing the shank and cap portions in a disassembled position;

FIG. 2 is a plan view of the shank and cap portions as produced by the initial blanking operation;

FIG. 3 is a plan view of the connecting rod during the broaching operation with a section taken through the broach itself showing the outer configuration thereof; and FIG. 4 is a plan view of the connecting rod showing the engagement of the parts.

DETAILED DESCRIPTION OF THE PREFERRED EMBODIMENT

Referring initially to FIG. 1, the component parts of a small connecting rod 10 are shown in an exploded position. The connecting rod 10 comprises a shank 12, cap 14 and cap screws 15. A wrist pin bore 16 is located at one end of the shank 12 and a precision circular crank pin bore 18 is formed when the cap 14 is attached to the shank 12 by means of the screws 15. The serrations on the mating surfaces of the shank 12 and cap 14 lock said parts in precise alignment upon assembly.

Referring now to FIG. 2 there is shown an unfinished connecting rod 10 as it is produced by the preliminary blanking operation. Blanking is similar to punching or pressing operations, and accomplishes the cutting of the complete outline of the work piece in a single stroke. It is very fast and economical, particularly adapted to manufacturing connecting rods in large quantities. Fine blanking, also known in the art as fine-edge blanking, produces precise blanks in a single operation without the fractured edges characteristically produced in convention of blanking operations. With fine blanking, no further finishing or machining is necessary to obtain an edge comparable to machined edges, or to those that are conventionally blanked and then shaved. With the medium carbon steel utilized in the preferred form of the present invention, blanking gives excellently formed edges with only normal tool wear. The blanks of the shank 12 and cap 14 are independently cut from cold rolled steel of medium carbon content. A medium carbon steel is generally considered to contain 20–40% carbon.

The utilization of a rolled steel is advantageous for several reasons. First, blanks produced from such steel will be flat on the upper and lower horizontal surfaces, thereby eliminating the prior art step of grinding these surfaces. Secondly, the use of a cold rolled steel contributes to the srtrength of of a part produced therefrom, and decreases the likelihood of warpage during the heat treatment of the part.

As shown in FIG. 2, the use of a blanking operation results in the cutting of the complete outline of the connecting rod 10 in a single stroke as well as forming the elongated indentations 13 on both sides of the shank 12. This efficient operation eliminates the costly machining of the outline of the rod, as well as the preliminary machining of the inner bore-serration configuration. Furthermore, with the use of fine-edge blanking, precise edges, comparable to machined edges, can be obtained with only minor deburring. A quick and efficient deburring operation known in the art as "tumbling" is advantageously utilized for this purpose.

In addition, the blanking operation is capable of producing a rough wrist pin bore 16 and crank pin bore 18. Although both of these bores will undergo subsequent machining in order to bring them to the close tolerances required, it is significant from the standpoint of economy that the great majority of metal removal is accomplished by this initial blanking operation.

FIG. 3 illustrates the second operation in the method of the present invention, which is, the broaching operation. In this operation, shank 12 and cap 14 are held secure in fixtures while the broach, a cross section of which is designated at 22, is passed between the mating surface 24 of the shank 12 and the mating surface of the cap 14. The broach itself is columnar and consists of several series of teeth similarly shaped, each of which removes a small portion of the metal along the entire length of the cut. These teeth sequentially remove metal from the mating surfaces of the shank and cap until the proper dimensions of the serrations 28, 29 are cut. As described above, the purpose of the serrations 28, 29 is to insure that no slippage will occur along the shank-cap mating surfaces 24 and 26. As can be noted in FIGS. 1, 3, and 4, two serrations 28 are formed on one side of the mating shank 12 and cap 14 and three serrations 29 are cut on the opposite side. This configuration permits the juxtaposition of the parts 12, 14 in one way only. Due to its unique cutting tooth arrangement, broaching is a very accurate operation because each successive series of teeth can cut a hole or notch with increasing accuracy. For example, the broaching tool advantageously includes a roughing series of teeth, followed by a semi-finish series of teeth, and concluding with a finishing or sizing series of teeth. As a result, the dimensions of the notched serrations 28 and the finish of mating surfaces 24 and 26 are efficiently formed with a high degree of precision.

Broach 22 also removes metal from the crank pin bore 18; because of the accuracy required in this bore, however, its final dimensions are achieved by means of a fine honing operation.

Besides the characteristic accuracy of this operation, broaching is particularly advantageous as applied to the method of the present invention in that it simultaneously accomplishes three distinct metal removing operations in a single operation: (i) the machining of mating surfaces 24 and 26, (ii) the machining of serrations 28, and (iii) the drilling of crank pin bore 18. Thus, the efficiency of the broaching operation is evident.

With the shank 12 and cap 14 joined together as shown in FIG. 4, bolt holes 30 are drilled and tapped in the connecting rod 10 in order to accommodate assembly cap screws 15. Clearance holes 31 are provided in the cap 14.

The connecting rod is then completely copper plated in preparation for heat treatment. Wrist and crank bores 16 and 18 are then drilled out in order to expose their inner steel surfaces. During the case-hardening phase of heat treatment, it is preferred that these surfaces become very hard to an effective case depth of 0.020 to 0.030 inches per side. It is highly desirable that the inner surfaces of the bores exhibit good hardness characteristics in order to withstand the extreme frictional forces exerted on them in operation. In the preferred method of the present invention, the heat treatment step achieves a hardness in the range of 58–62 Rockwell on the C Scale upon these surfaces.

On the other hand, it is desirable that the remaining portions of the connecting rod be flexible in order to withstand the bending stresses experienced by them during operation. Therefore, the copper plating is allowed to remain on the remainder of the rod surfaces in order to prohibit the diffusion of carbon atoms into the steel during case hardening and thereby prevent the hardening of these areas. As a result, the core hardness of the connecting rod after the heat treatment stop has advantageously a hardness in the range of 20–35 Rockwell on the C Scale.

Following the heat treatment step, the bores 16 and 18 are finely honed to their proper tolerances. The connecting rod is now complete and is depicted in FIG. 1.

In summary, the method of this invention including the steps of fine blanking and broaching provides for the rapid yet economical manufacture of high quality connecting rods for small reciprocating engines. Compared to previous methods, the method of the present invention yields a higher production rate with a lower scrap rate.

What is claimed is:

1. A method for the manufacture of connecting rods for small reciprocating engines from rolled steel having sufficient carbon content so as to minimize the subsequent case hardening and thereby provide for minimal scrappage of defective rods due to warpage comprising:
   blanking the rod configuration from rolled steel of appropriate thickness;
   deburring of the rod blank;
   drilling and tapping of dual bolt holes used in mating the shank and cap of said rod;
   broaching the crank pin bearing bore;
   copper plating the entire surface of said rod;
   drilling out bores of said rod thus exposing steel surface of the interior diameters of said bores;
   case hardening said interior diameters to an effective case depth of 0.020–0.030 inches per side;
   heat treating said rod to a surface hardness in the range of 58–62 Rockwell, C Scale, and a core hardness in the range of 20–35 Rockwell, C Scale; and
   honing the inner diameters of said bores to the appropriate close tolerances.

2. A method for the manufacture of connecting rods for small reciprocating engines, as defined in claim 1, wherein, said blanking step includes fine blanking such that precise blanks are produced in a single operation.

3. A method for the manufacture of connecting rods for small reciprocating engines, as defined in claim 1, wherein said blanking step comprises the separate blanking of shank and cap portions of said rod such that the subsequent breaking of a rod to obtain said shank and cap portions is made unnecessary.

4. A method for the manufacture of connecting rods for small reciprocating engines, as defined in claim 3, wherein said broaching step comprises:
   simultaneous broaching of said shank and cap portions of said rod to form a crank pin bore; and
   broaching the mating surfaces of said shank and cap to form serrations therein for the secure mating of said shank and cap;
   said broaching of mating surfaces occurring simultaneously with said simultaneous broaching of said shank and cap portions of said rod.

5. A method for the manufacture of connecting rods for small reciprocating engines comprising:
   fine blanking the shank and cap portions which together constitute said rod;

broaching the bores in said rod and simultaneously broaching serrations in the mating surfaces between said shank and cap;
drilling and tapping bolt holes;
heat treating said rod; and
honing said bores to the appropriate inner diameters.

6. A method for the manufacture of connecting rods for small reciprocating engines, as defined in claim 6, wherein said broaching step provides for the interchangeability between the shank of a first rod and the shank of a second rod, such that said second shank will mate with the cap of said first rod and vice versa.

7. A method for the manufacture of connecting rods for small reciprocating engines comprising:
fine blanking the shank and cap portions which together constitute said rod;
broaching the bores in said rod and simultaneously broaching serrations in the mating surfaces between said shank and cap;
drilling and tapping bolt holes; and
honing said bores to the appropriate inner diameters.

* * * * *